United States Patent
Onishi et al.

(10) Patent No.: US 9,393,931 B2
(45) Date of Patent: Jul. 19, 2016

(54) OCCUPANT PROTECTION APPARATUS FOR VEHICLE

(71) Applicant: Fuji Jukogyo Kabushiki Kaisha, Tokyo (JP)

(72) Inventors: Keita Onishi, Tokyo (JP); Tadashi Tsuneyoshi, Tokyo (JP); Takao Kondo, Tokyo (JP); Shinya Motomura, Tokyo (JP); Junichi Orai, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/853,781

(22) Filed: Sep. 14, 2015

(65) Prior Publication Data
US 2016/0090063 A1    Mar. 31, 2016

(30) Foreign Application Priority Data

Sep. 30, 2014   (JP) ................. 2014-199825

(51) Int. Cl.
| | |
|---|---|
| *B60R 21/0136* | (2006.01) |
| *B60R 22/48* | (2006.01) |
| *B60N 2/00* | (2006.01) |
| *B60R 21/013* | (2006.01) |

(52) U.S. Cl.
CPC ............... *B60R 22/48* (2013.01); *B60N 2/002* (2013.01); *B60R 21/0136* (2013.01); *B60R 2021/01315* (2013.01); *B60R 2021/01317* (2013.01); *B60R 2022/4808* (2013.01)

(58) Field of Classification Search
CPC ............... B60R 22/48; B60R 21/0136; B60R 2022/4808; B60R 2021/01317; B60R 2021/01315; B60N 2/002

USPC ............................................................ 701/46
See application file for complete search history.

(56) References Cited

U.S. PATENT DOCUMENTS

| | | | |
|---|---|---|---|
| 2005/0065688 A1* | 3/2005 | Rao ....................... | B60R 21/013 701/45 |
| 2006/0076178 A1* | 4/2006 | Eberle ................... | B60R 21/013 180/271 |
| 2008/0221758 A1* | 9/2008 | Bernzen .............. | B60R 21/0132 701/45 |

FOREIGN PATENT DOCUMENTS

| | | |
|---|---|---|
| JP | 2000-020898 A | 1/2000 |
| JP | 2014-118035 A | 6/2014 |

* cited by examiner

*Primary Examiner* — Richard Camby
(74) *Attorney, Agent, or Firm* — McGinn IP Law Group, PLLC

(57) ABSTRACT

An occupant protection apparatus for a vehicle includes a door sensor that detects a defamation of a side door in a side collision and an occupant position detection sensor that detects a lumbar position of the occupant. A pretensioner is activated when it is determined from detection by the door sensor and the occupant position detection sensor that an intruding-object collision rear-end position in the side door is located in front of the lumbar position, and the pretensioner is prohibited from activation when it is determined that the intruding-object collision rear-end position is not located in front of the lumbar position. When there is a possibility that a clearance between the lumbar of the occupant and the deformed side door is insufficient, the pretensioner is prohibited from activation to allow the occupant to move at the early stage of a collision.

5 Claims, 3 Drawing Sheets

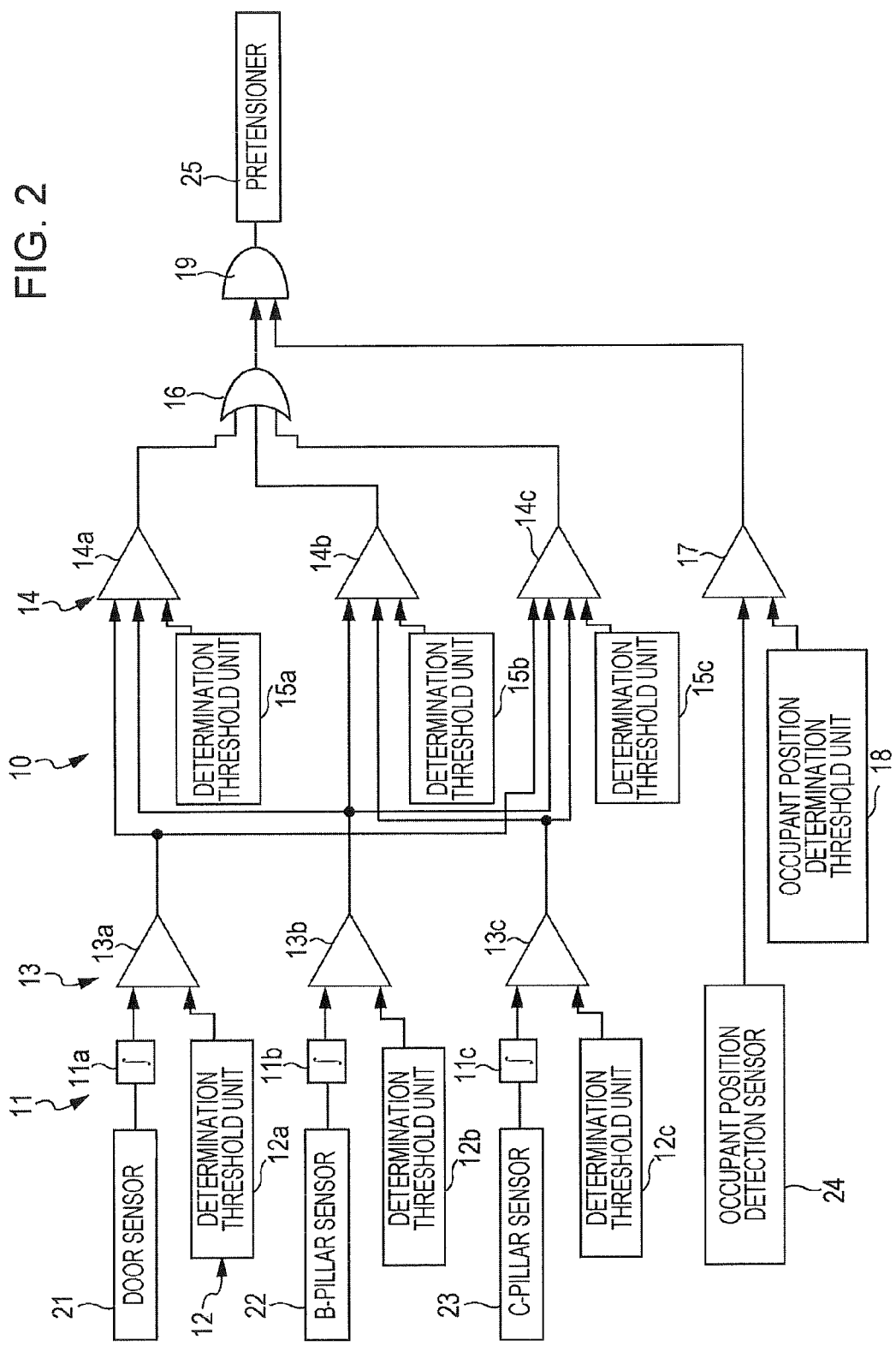

OCCUPANT PROTECTION APPARATUS FOR VEHICLE

CROSS REFERENCES TO RELATED APPLICATIONS

The present application claims priority from Japanese Patent Application No. 2014-199825 filed on Sep. 30, 2014, the entire contents of which are hereby incorporated by reference.

BACKGROUND

1. Technical Field

The present invention relates to occupant protection apparatuses for vehicles and in particular a vehicle occupant protection apparatus that protects an occupant in the event of a side collision.

2. Related Art

Vehicles are provided with various types of occupant protection apparatuses. Such occupant protection apparatuses include an airbag that inflates and deploys to restrain and protect an occupant in the event of a vehicle collision and a pretensioner that restrains and protects an occupant by tightening a seat belt instantaneously in the event of a vehicle collision.

An occupant protection apparatus disclosed in Japanese Unexamined Patent Application Publication (JP-A) No. 2006-88912 causes a determination unit to make a determination, based on an acceleration signal from an acceleration detector, as to whether or not a collision occurs and, if it is determined that a collision occurs, activates protection devices such as airbags and pretensioners.

An occupant protection apparatus disclosed in JP-A No. 2014-11-8035 has first and second sensors that detect an impact to a vehicle side and a collision unit that makes a determination of a collision by making a comparison between detection signals from the sensors and a determination threshold. A pretensioner is activated or is prohibited from activation in accordance with results from the comparison between detection signals from the first and second sensors and the determination threshold.

In the event of a vehicle collision, the occupant protection apparatuses disclosed in JP-A Nos. 2006-88912 and 2014-118035 activate the pretensioner to instantaneously restrain an occupant and prevent movement of the occupant due to an inertial force, thereby maintaining a clearance between the occupant and an impact area to prevent an increase in injury level that the occupant experiences.

SUMMARY OF THE INVENTION

When a vehicle is subjected at a side door thereof to a local load in the event of, for instance, a so-called pole side collision, such a side door is locally deformed and intrudes into a passenger compartment. In some cases, the deformed side door intruding into the passenger compartment may make it difficult to maintain a clearance between the side door and an occupant seated in a seat. In these cases, the pretensioner is preferably prohibited from activation to allow the occupant to move at the early stage of a collision in order to ensure that there is a clearance between the side door and the occupant.

In contrast, in the case of a moving deformable barrier (MDB) side collision where the vehicle is subjected to a load over a relatively large area of its side surface, such a load is dispersed over the large area of the vehicle side, resulting in a relatively smaller amount of intrusion of the side door into the passenger compartment and, as a result, a clearance is maintained between the side door and the occupant. In this case, since the side door is unlikely to come into contact with the occupant, the pretensioner is preferably activated to instantaneously restrain the occupant and prevent movement of the occupant due to an inertial force.

Accordingly, it is desirable to provide an occupant protection apparatus for a vehicle that, depending on a collision situation, activates a pretensioner or prohibits the pretensioner from activation to prevent an increase in injury level that the occupant sustains in the event of a side collision.

A first aspect of the present invention provides an occupant protection apparatus for a vehicle, including a pretensioner that, when activated, may prevent movement of an occupant seated in a seat disposed adjacent to a side door provided on a side of a passenger compartment, a door sensor that detects a deformation of the side door associated with a side collision, an occupant position detection sensor that detects a lumbar position of the occupant seated in the seat, and a control unit that activates the pretensioner when determining, from results of the detection by the door sensor and the occupant position detection sensor, that an intruding-object collision rear-end position in the side door is located in front of the lumbar position and prohibits the pretensioner from activation when determining that the intruding-object collision rear-end position in the side door is not located in front of the lumbar position.

The door sensor may integrate, for a given length of time, input loads exerted on front and rear ends, respectively, of a door beam longitudinally extending inside the side door to detect a collision deformation and an intrusion direction.

The door sensor may be an external recognition device that detects the collision deformation of the side door.

The door sensor may estimate a door deformation on the basis of input load information detected for a given length of time and preset map information.

The door sensor may be an input load sensor and the external recognition device.

BRIEF DESCRIPTION OF THE DRAWINGS

FIG. 2 is a diagram illustrating a configuration of a control unit of the occupant protection apparatus according to the example of the present invention.

DETAILED DESCRIPTION

An example of the present invention is described below with reference to the attached drawings.

Figure 1:
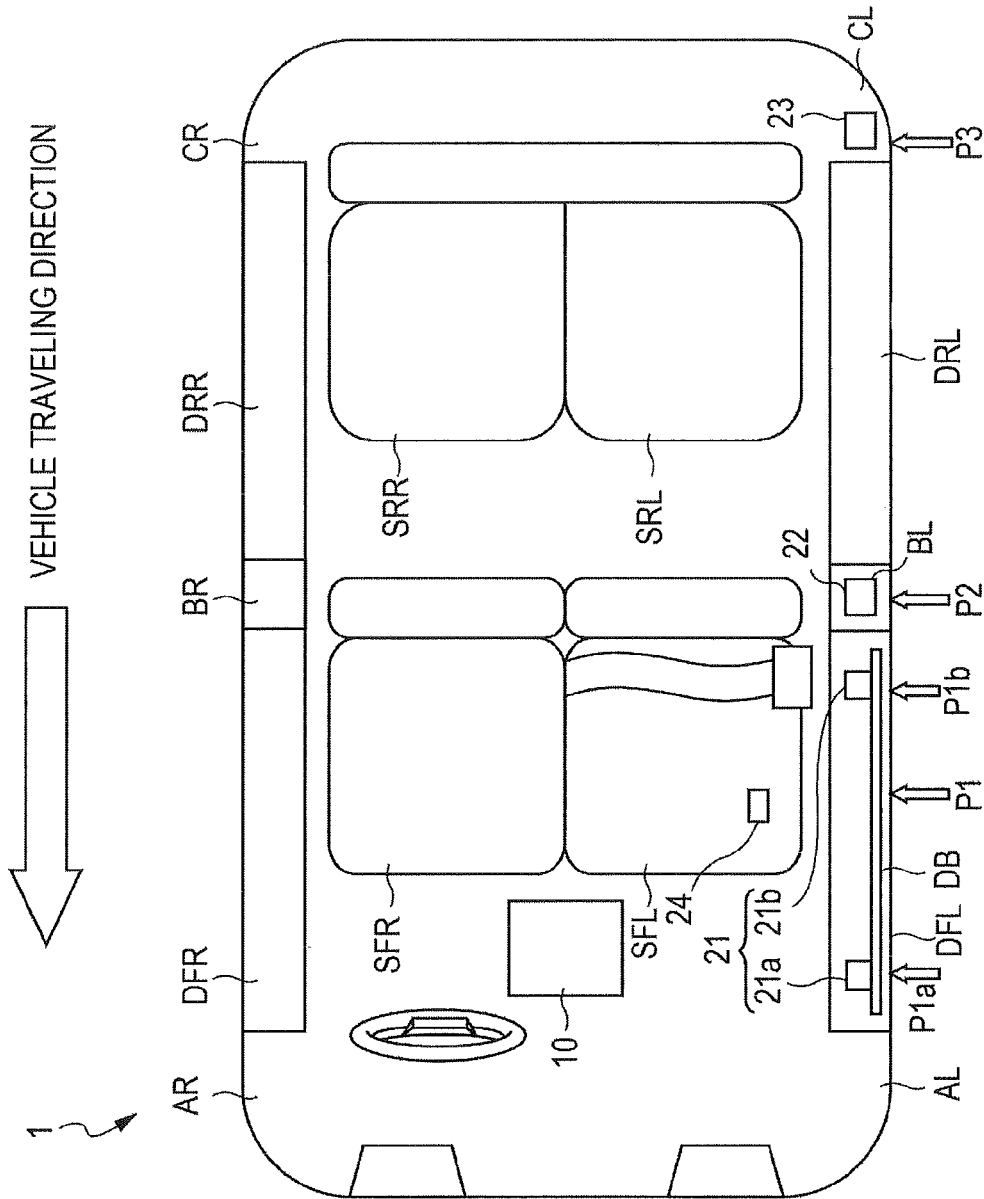
FIG. 1 is a schematic diagram of a vehicle provided with an occupant protection apparatus according to an example of the present invention.
Figure 3C:
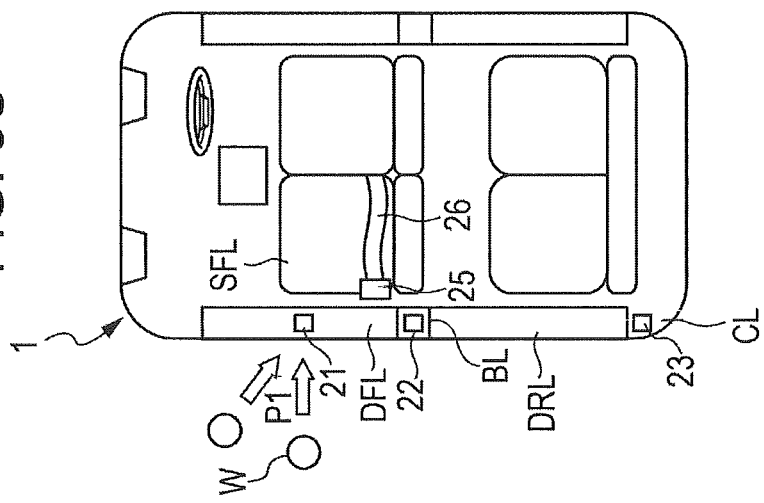
FIGS. 3A to 3C are explanatory-diagrams illustrating operation of the occupant protection apparatus according to the example of the present invention.
Figure 3B:
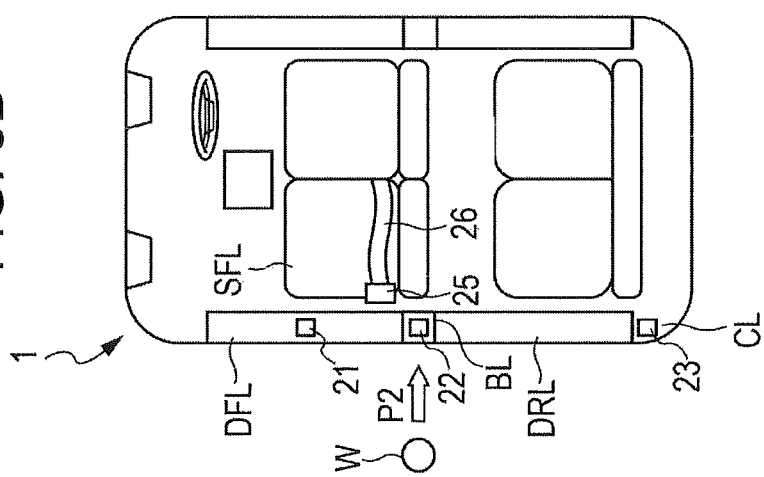
Figure 3A:
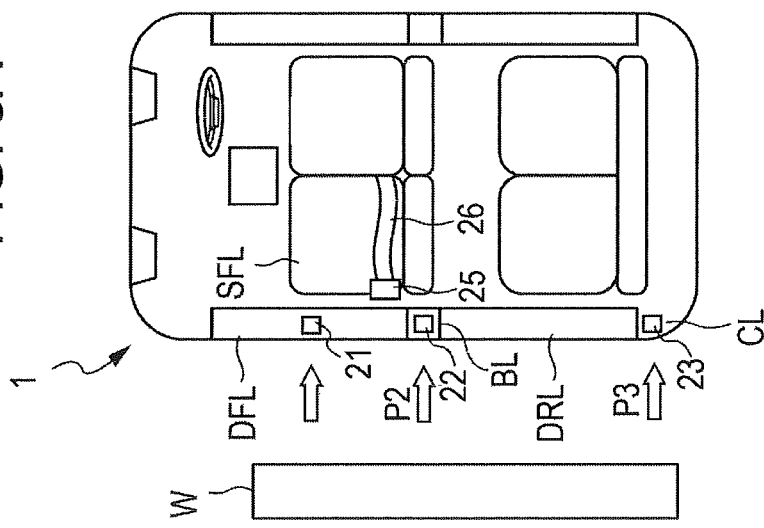

FIG. 1 is a schematic diagram of a vehicle 1 provided with an occupant protection apparatus. FIG. 2 is a diagram illustrating a configuration of a control unit of the occupant protection apparatus. FIGS. 3A, 3B, and 3C are explanatory diagrams Illustrating operation of the occupant protection apparatus.

As illustrated in FIG. 1, the vehicle 1 has an A-pillar AR, a B-pillar BR, and a C-pillar CR arranged on the right side thereof in this order from the front to the rear, in which a side door DFR hinged at its front end to the A-pillar AR so as to be opened and closed is disposed between the A-pillar AR and the B-pillar BR and a side door DRR hinged at its front end to the B-pillar BR so as to be opened and closed is disposed between the B-pillar BR and the C-pillar CR. Likewise, the vehicle 1 has an A-pillar AL, a B-pillar BL, and a C-pillar CL arranged on the left side thereof in this order from the front to the rear, in which a side door DFL is disposed between the A-pillar AL and the B-pillar BL and a side door DRL is disposed between the B-pillar BL and the C-pillar CL.

In a passenger compartment, seats SFR, SFL are arranged side by side between the front side doors DFR, DFL so as to be located adjacent to the side doors DFR and DFL, respectively, while seats SRR, SRL are arranged side by side between the rear side doors DRR, DRL. The front seats SFR, SFL have their rear ends located adjacent to the B-pillars BR, BL, respectively and are configured in such a manner that the longitudinal seat position is adjustable.

When the side door DFL is subjected to a local load P1 in the event of, for instance, a side pole collision, an impact area in the side door DFL which has been impacted by a collision object locally intrudes into the passenger compartment, which may pose a concern about a reduced clearance or an insufficient clearance between the side door DFL and a lumbar position of an occupant seated in the seat SFL set to, for instance, a forward seat position. In contrast, when a relatively large area on a vehicle side is subjected to a load in the event of a MDB side collision, such a load is dispersed over the large area on the vehicle side, resulting in a relatively smaller amount of intrusion of the side door DRL into the passenger compartment and a sufficient clearance being maintained between the occupant seated in the seat SFL and the side door DFL or the B-pillar BL.

Next, the occupant protection apparatus installed on the vehicle 1 is outlined below. Since the occupant protection apparatus functions in the same manner in the event of impacts coming from either side of the vehicle, descriptions of an impact from one side are provided below for simplification.

The occupant protection apparatus has an electronic control unit (ECU) 10, a door sensor 21, a B-pillar sensor 22, a C-pillar sensor 23, an occupant position detection sensor 24, and a pretensioner 25, in which the ECU 10 is connected to the sensors 21, 22, 23, 24 and the pretensioner 25 through a communications line (not illustrated).

The door sensor 21 detects an input load P1, a collision speed, a collision position, a collision intrusion direction, and a deformation amount or other collision deformation, all of which pertain to the side door DFL in the event of a side collision. Sensors 21a, 21b, for instance, are provided, detecting input loads exerted on the front and rear ends, respectively, of a door beam DB that is a door reinforcing member longitudinally extending inside the side door DFL. The input load P1, the collision speed, the collision intrusion direction, the deformation amount, and an intruding object collision position are detected or predicted by integrating the input loads P1a, P1b exerted on the front and rear ends of the door beam DB for a given length of time and making reference to a threshold level or other map information indicating a collision deformation state that is preset if needed.

The B-pillar sensor 22 is provided inside the B-pillar BL, detecting an input load P2 and a collision deformation that the B-pillar BL is subjected to in the event of a side collision. The C-pillar sensor 23 is disposed inside the C-pillar CL, detecting an input load P3 and a collision deformation that the C-pillar CL is subjected to in the event of a side collision.

The occupant position detection sensor 24 detects or predicts a lumbar position of an occupant seated in the seat SFL, consisting of, for instance, a seat slide position sensor that detects a longitudinal seat position in the seat SFL. The lumbar position described above means a position of a hipbone, a front or rear end of the lumbar, or other broader part of the lumbar, which is appropriately chosen, if needed, for the purpose of description of the example.

The pretensioner 25 is activated or prohibited from activation in accordance with an instruction from the ECU 10. The pretensioner 25, when activated, instantaneously tightens up the slack of a seat belt 26 of the seat SFL, preventing the seat belt 26 from being pulled out. The pretensioner 25, when prohibited from activation, allows the seat belt 26 to be slackened as a conventional retractor, giving an occupant freedom of movement at an early stage of a collision.

The ECU 10 is disposed substantially in the middle of the vehicle 1 and controls the determination as to a collision state applied to the vehicle 1 and the activation of the pretensioner 25. More specifically, as illustrated in FIG. 2, the ECU 10 has integration units 11 (11a, 11b, 11c), determination threshold units 12 (12a, 12b, 12c), collision determination units (13a, 13b, 13c), collision position determination units 14 (14a, 14b, 14c), determination threshold units 15 (15a, 15b, 15c), a logic circuit unit (OR circuit) 16, an occupant position determination unit 17, and a pretensioner activation instruction unit 19.

The integration unit 11 receives an input load value and the like from the door sensor 21, the B-pillar sensor 22 and the C-pillar sensor 23 and calculates an integrated value for the input load and the like. The integration unit 11a receives an input load value and other detection signal value from the door sensor 21 and calculates an integrated value for the input load P1 and the like. The integration unit 11b receives an input load value and other detection signal value from the B-pillar sensor 22 and calculates an integrated value for the input load P2 and the like. The integration unit 11c receives an input load value and other detection signal value from the C-pillar sensor 23 and calculates an integrated value for the input load P3 and the like.

The determination threshold unit 12 holds a preset determination threshold (including map information or other determination threshold for making determination of a collision and predicting a collision deformation that is set in advance). A determination threshold held by the determination threshold unit 12a is used for determination for detection results from the door sensor 21. Map information or other determination threshold held by the determination threshold unit 12b is used for determination for detection results from the B-pillar sensor 22. Map information or other determination threshold held by the determination threshold unit 12c is used for determination for detection results from the C-pillar sensor 23.

The collision determination unit 13a makes a comparison between the integrated value for the input load P1 and the like calculated by the integration unit 11a and the map information or other determination threshold held by the determination threshold unit 12a. If the integrated value exceeds the determination threshold, the unit 13a determines that a collision has occurred, predicts a collision deformation and an intruding-object collision rear-end position and the like, and outputs it to the collision position determination units 14a, 14c.

The collision determination unit 13b makes a comparison between the integrated value for the input load P2 and the like calculated by the integration unit 11b and the map information or other determination threshold held by the determination threshold unit 12b. If the integrated value exceeds the determination threshold, the unit 13b determines that a collision has occurred, predicts a collision deformation, and output it to the collision position determination units 14a, 14b, 14c.

The collision determination unit 13c makes a comparison between the integrated value for the input load P3 and the like calculated by the integration unit 11c and the map information or other determination threshold held by the determination threshold unit 12c. If the integrated value exceeds the determination threshold, the unit 13c determines a collision has occurred, predicts a collision deformation, and outputs it to the collision position determination units 14b, 14c.

Based on a difference threshold preset in the determination threshold unit 15a, the collision position determination unit 14a calculates the difference between a door input load value from the collision determination unit 13a and a B-pillar input load value from the collision determination unit 13b and, if the door input load value is greater than the B-pillar input load value, outputs a collision signal for the door to the pretensioner activation instruction unit 19 through the logic circuit unit 16.

Based on a difference threshold preset in the determination threshold unit 15b, the collision position determination unit 14b calculates the difference between the B-pillar input load value from the collision determination unit 13b and a C-pillar input load value from the collision determination unit 13c and, if the B-pillar input load value is greater than the C-pillar input load value, outputs a collision signal for the B-pillar to the pretensioner activation instruction unit 19 through the logic circuit unit 16.

Based on a difference threshold preset in the determination threshold unit 15c, the collision position determination unit 14c calculates differences between the door input load value from the collision determination unit 13a, the B-pillar input load value from the collision determination unit 13b and the C-pillar input load value from the collision determination unit 13c and, if the differences between the door input load value, the B-pillar input load value, and the C-pillar input load value are small, determines that an MDB collision has occurred and outputs an MDB collision signal to the pretensioner activation instruction unit 19 through the logic circuit unit 16.

The occupant position determination unit 17 receives occupant position information detected by the occupant position detection sensor 24, determines an occupant lumbar position through the comparison with an occupant position determination threshold of an occupant position determination threshold unit 18, and outputs the result as an occupant lumbar position signal to the pretensioner activation instruction unit 19.

The pretensioner activation instruction unit 19 activates the pretensioner 25 or prohibits the pretensioner 25 from activation in accordance with the received door collision signal, the B-pillar collision signal, the MDB collision signal, and the occupant lumbar position signal. Specifically, the unit 19 activates the pretensioner 19 when receiving the door collision signal and the occupant lumbar position signal and determining that the intruding-object collision rear-end position is located in front of the lumbar position, when receiving the B-pillar collision signal and the occupant lumbar position signal and determining that the lumbar position is located in front of the B-pillar BL, and when receiving the MDB signal. In contrast, the pretensioner activation instruction unit 19 prohibits the pretensioner 25 from activation when receiving the door collision signal and the occupant lumbar position signal and determining that the intruding-object collision rear-end position is not located in front of the lumbar position and when receiving the B-pillar collision signal and the occupant lumbar position signal and determining that the lumbar position is not located in front of the B-pillar BL.

With this arrangement, pretensioner control performed by the vehicle 1 provided with the occupant protection apparatus is described below with reference to FIGS. 3A to 3C. FIG. 3A illustrates a plan view of an MDB collision. FIGS. 3B and 3C illustrate a plan view of a pole collision.

As illustrated in FIG. 3A, in the case of a MDB side collision where a vehicle or other collision object W collides with a large side surface of the vehicle 1, an impact load from the collision object W is dispersed over a broad area ranging from the side door DFL to the C-pillar CL, resulting in a relatively smaller amount of intrusion of the side door DFL, the B-pillar BL, and the C-pillar CL into the passenger compartment and a clearance being maintained between the lumbar of the occupant seated in the seat SFL and the side door DFL or the B-pillar BL. This prevents an increase in injury level that the occupant sustains during a collision.

In the case of the MDB side collision, the door sensor 21 disposed in the side door DFL, the B-pillar sensor 22 disposed in the B-pillar BL, and the C-pillar sensor 23 disposed in the C-pillar CL receive input loads P1, P2, P3, respectively, that are equal in level or have small differences therebetween. In accordance with the input load detected by the door sensor 21, the B-pillar sensor 22, and the C-pillar sensor 23, the ECU 10 activates the pretensioner 25 to instantaneously restrain the occupant seated in the seat SFL and prevent the occupant from moving due to inertia, thereby preventing an increase in injury level that the occupant sustains during an MDB side collision.

As illustrated in FIG. 3B, in the case of a pole side collision where a vehicle or other collision object W collides with the B-pillar BL of the vehicle 1 when the occupant is seated in the seat SFL whose seat position is set to a position at which the occupant's lumbar is located in front of the B-pillar BL, an impact load from the collision object W is exerted mainly on the B-pillar BL, which raises a concern about a deformed B-pillar BL intruding into the passenger compartment. However, due to a relatively large clearance between the intruding B-pillar BL and the lumbar of the occupant seated in the seat SFL, a clearance between the B-pillar BL and the occupant's lumbar is maintained, thereby preventing an increase in injury level that the occupant sustains during a collision.

At this time, an extremely large input load P2 is exerted on the B-pillar sensor 22 provided in the B-pillar BL as compared to the door sensor 21 and the C-pillar sensor 23 provided, respectively, in the side door DFL and the C-pillar. In addition, the occupant position detection sensor 24 detects that the lumbar position is located in front of the B-pillar BL. In accordance with the results from the detection by the B-pillar sensor 22 and the occupant position detection sensor 24, the ECU 10 activates the pretensioner 25 to instantaneously restrain the occupant seated in the seat SFL and prevent the movement of the occupant, thereby preventing an increase in injury level that the occupant sustains during a side pole collision.

In contrast, in the case of a side pole collision where a vehicle or other collision object W collides with the B-pillar BL of the vehicle 1 when the occupant's lumbar is not in front of the B-pillar BL, namely, the occupant is seated in the seat SFL whose seat position is set to a rearward position, an impact load from the collision object W is exerted mainly on the B-pillar BL, which raises a concern about the intrusion of the deformed B-pillar BL into the passenger compartment, making the B-pillar BL closer to the occupant's lumbar.

At this time, a relatively large input load P2 is exerted on the B-pillar sensor 22. In addition, the occupant position detection sensor 24 detects that the lumbar position is not located in front of the B-pillar BL. In accordance with the results from the detection by the B-pillar sensor 22 and the occupant position detection sensor 24, the ECU 10 prohibits the pretensioner 25 from activation.

With this arrangement, when a local load is exerted on the B-pillar BL during a side pole collision while the occupant is seated in the seat SEL whose seat position is set to a position at which the occupant's lumbar is not located in front of the B-pillar BL, the pretensioner 25 is prohibited from activation to allow the occupant to move at the early stage of a collision, which enables a clearance to be maintained between the B-pillar BL and the occupant, thereby preventing an increase in injury level that the occupant sustains.

As illustrated in FIG. 3C, in the case of a side pole collision where a vehicle or other collision object W collides with the side door DFL of the vehicle 1 when the occupant is seated in the seat SFL, an impact load from the collision object W is exerted mainly on the side door DFL, which raises a concern about a locally deformed collision position or intruding object collision position of the side door DFL that intrudes into the passenger compartment.

In the case of a side pole collision where the collision object W collides with the side door DFL of the vehicle 1, the door sensor 21 detects a deformation of the side door DFL and the occupant position detection sensor 24 detects the lumbar position of the occupant seated in the seat SFL. When determining from the results of the detection by the door sensor 21 and the occupant position detection sensor 24 that the lumbar position is not located in front of the intruding object collision rear-end position, the ECU 10 activates the pretensioner 25 to instantaneously restrain the occupant and prevent the occupant from moving, thereby preventing an increase in injury level that the occupant sustains. In other words, when determining that the intruding object collision rear-end position of the side door DFL deformed as a result of a collision is located in front of the lumbar position of the occupant seated in the seat SFL and that a clearance is maintained between the side door DFL and the occupant even if the deformed side door intrudes into the passenger compartment, the ECU 10 activates the pretensioner 25 to instantaneously restrain the occupant and prevent the occupant from moving, thereby preventing an increase in injury level that the occupant sustains during a side pole collision.

In contrast, in the case of a side pole collision where the collision object W collides with the side door DFL of the vehicle 1, the door sensor 21 detects a deformation of the side door DFL and the occupant position detection sensor 24 detects the lumbar position of the occupant seated in the seat SFL. When determining from the results of the detection by the door sensor 22 and the occupant position detection sensor 24 that the lumbar position is located in front of the intruding object collision rear-end position, the ECU 10 the pretensioner 25 from activation to allow the occupant to move at the early stage of a collision. This arrangement enables a clearance to be maintained between the side door DFL and the occupant, thereby preventing an increase in injury level that the occupant sustains. In other words, when the lumbar position of the occupant seated in the seat SFL is located in front of the collision deformation position rear-end of the side door DFL deformed as a result of a collision and there is a concern about a reduced or insufficient clearance with the lumbar of the occupant due to the deformed side door DFL, the pretensioner 25 is prohibited from activation to allow the occupant to move immediately after a collision, namely, at the early stage of a collision. This arrangement enables a clearance to be maintained between the side door DFL and the occupant, thereby preventing an increase in injury level that the occupant sustains in the event of a side collision.

Accordingly, the occupant protection apparatus according to the above example has the door sensor 21, the B-pillar sensor 22, the C-pillar sensor 23, and the occupant position detection sensor 24. In the event of a side collision, when determining from the results of the detection by the door sensor 21, the B-pillar sensor 22, the C-pillar sensor 23, and the occupant position detection sensor 24 that a clearance is maintained between the lumbar of the occupant seated in the seat SFL and the side door DFL or the B-pillar BL, the apparatus activates the pretensioner 25 to instantaneously restrain the occupant seated in the seat SFL and prevent the occupant from moving.

In contrast, when determining that a clearance is insufficient between the lumbar of the occupant seated in the seat SFL and the side door DFL or the B-pillar BL, the apparatus prohibits the pretensioner 25 from activation to allow the occupant to move at the early stage of a collision, which enables a clearance to be maintained between the B-pillar BL intruding into the passenger compartment and the occupant seated in the seat SFL, thereby preventing an increase in injury level that the occupant sustains.

The present invention is generally described with reference to, but not limited to, the foregoing example. Various modifications are conceivable within the scope of the present invention. The door sensor 21 is used to detect the amount of deformation and intrusion direction for the side door DFL in the above example, but a camera or other external recognition device, for instance, can be used.

The combined use as a door sensor of a camera or other external recognition device that has advantages in detecting a deformation speed and size and a load sensor that has advantages in detecting an input load provide high-precision collision deformation information.

In addition, the seat slide position sensor is used as an occupant position sensor, but a camera can be used to directly capture the position of the occupant.

The invention claimed is:

1. An occupant protection apparatus for a vehicle, the occupant protection apparatus comprising:
   a pretensioner that, when activated, prevents a movement of an occupant seated in a seat disposed adjacent to a side door provided on a side of a passenger compartment;
   a door sensor that detects a deformation of the side door associated with a side collision;
   an occupant position detection sensor that detects a lumbar position of the occupant seated in the seat; and
   a control unit that activates the pretensioner when determining, from results of the detection by the door sensor and the occupant position detection sensor, that an intruding-object collision rear-end position in the side door is located in front of the lumbar position and prohibits the pretensioner from activation when determining that the intruding-object collision rear-end position in the side door is not located in front of the lumbar position.

2. The occupant protection apparatus for a vehicle according to claim 1, wherein the door sensor integrates, for a given length of time, input loads exerted on front and rear ends, respectively, of a door beam longitudinally extending inside the side door to detect a collision deformation and an intrusion direction.

3. The occupant protection apparatus for a vehicle according to claim 1, wherein the door sensor is an external recognition device that detects collision deformation of the side door.

4. The occupant protection apparatus for a vehicle according to claim 1, wherein the door sensor estimates a door deformation on the basis of input load information detected for a given length of time and preset map information.

5. The occupant protection apparatus for a vehicle according to claim 1, wherein the door sensor is an input load sensor and the external recognition device.

\* \* \* \* \*